United States Patent
Maillot et al.

(10) Patent No.: US 9,342,901 B2
(45) Date of Patent: May 17, 2016

(54) MATERIAL DATA PROCESSING PIPELINE

(75) Inventors: Jérôme Maillot, Cazaux (FR); Eric Bourque, Laval (CA)

(73) Assignee: AUTODESK, Inc., San Rafael, CA (US)

( * ) Notice: Subject to any disclaimer, the term of this patent is extended or adjusted under 35 U.S.C. 154(b) by 1385 days.

(21) Appl. No.: 12/259,205

(22) Filed: Oct. 27, 2008

(65) Prior Publication Data

US 2010/0103171 A1  Apr. 29, 2010

(51) Int. Cl.
*G06F 15/00* (2006.01)
*G06T 11/00* (2006.01)

(52) U.S. Cl.
CPC .................................... *G06T 11/001* (2013.01)

(58) Field of Classification Search
CPC ..... G06T 11/001; G06T 15/00; G06T 15/005; G06T 9/00; G06T 9/001
USPC .......................................... 345/501, 426, 582
See application file for complete search history.

(56) References Cited

U.S. PATENT DOCUMENTS

| | | | |
|---|---|---|---|
| 5,481,665 A | 1/1996 | Okada et al. | |
| 5,604,824 A * | 2/1997 | Chui et al. | 382/248 |
| 5,617,564 A | 4/1997 | Tomotake | |
| 5,687,304 A | 11/1997 | Kiss | |
| 5,696,892 A | 12/1997 | Redmann et al. | |
| 5,710,878 A | 1/1998 | McCoy et al. | |
| 5,790,131 A * | 8/1998 | Liang et al. | 345/660 |
| 5,835,093 A | 11/1998 | Fujishita et al. | |
| 5,886,701 A | 3/1999 | Chauvin et al. | |
| 5,991,770 A | 11/1999 | Zamora-McKelvy et al. | |
| 6,128,540 A | 10/2000 | Van Der Vegt et al. | |
| 6,151,624 A | 11/2000 | Teare et al. | |
| 6,253,366 B1 | 6/2001 | Mutschler, III | |
| 6,456,288 B1 | 9/2002 | Brockway et al. | |
| 6,518,989 B1 | 2/2003 | Ishikawa | |
| 6,574,791 B1 | 6/2003 | Gauthier et al. | |
| 6,867,781 B1 | 3/2005 | Van Hook et al. | |
| 6,868,538 B1 | 3/2005 | Nixon et al. | |
| 6,947,037 B1 | 9/2005 | Lynn et al. | |
| 7,023,437 B1 | 4/2006 | Voorhies et al. | |
| 7,266,616 B1 * | 9/2007 | Munshi et al. | 709/246 |

(Continued)

OTHER PUBLICATIONS

Office Action in U.S. Appl. No. 12/040,725 mailed Jun. 7, 2011.

(Continued)

*Primary Examiner* — Hau Nguyen
(74) *Attorney, Agent, or Firm* — Artegis Law Group, LLP

(57) ABSTRACT

A method for generating a shader that is used by a rendering engine to render a visual representation of a computer model. A shader generation engine receives a set of surface data that describes a surface in view of various lighting conditions. The shader generation engine compresses the set of surface data to generate a compressed representation of the set of surface data based on a selected compression algorithm. The shader generation engine generates a shader based on the compressed representation that is configured to be implemented with a rendering engine, and generates a set of shader data based on the compressed representation that includes a set of material characteristics for coloring pixels of the visual representation. Advantageously, the shader generation process is simplified because different compression algorithm-rendering engine shader combinations can be generated without manually programming the shaders.

30 Claims, 5 Drawing Sheets

(56) References Cited

U.S. PATENT DOCUMENTS

| | | | |
|---|---|---|---|
| 7,307,640 | B2 | 12/2007 | Demers et al. |
| 7,412,404 | B1 | 8/2008 | Tenorio |
| 7,423,653 | B2 | 9/2008 | Gettman et al. |
| 7,523,411 | B2 | 4/2009 | Carlin |
| 7,574,659 | B2 | 8/2009 | Szabo |
| 7,596,418 | B2 | 9/2009 | Bugosh |
| 7,624,349 | B2 | 11/2009 | Seemann et al. |
| 7,629,985 | B2 | 12/2009 | McArdle et al. |
| 7,640,496 | B1 | 12/2009 | Chaulk et al. |
| 7,701,461 | B2 | 4/2010 | Fouladi et al. |
| 7,840,937 | B1 | 11/2010 | Chiluvuri |
| 7,878,148 | B2 | 2/2011 | Swenson et al. |
| 8,024,721 | B2 | 9/2011 | Matic |
| 8,091,069 | B2 | 1/2012 | Rojer |
| 2002/0030689 | A1 | 3/2002 | Eichel et al. |
| 2002/0039101 | A1 | 4/2002 | Fernandez et al. |
| 2003/0031371 | A1* | 2/2003 | Kato et al. ............. 382/239 |
| 2003/0167213 | A1 | 9/2003 | Jammes et al. |
| 2003/0226116 | A1 | 12/2003 | Kuwata et al. |
| 2004/0109563 | A1* | 6/2004 | Evans et al. ............ 380/227 |
| 2004/0162845 | A1 | 8/2004 | Kim et al. |
| 2004/0174998 | A1* | 9/2004 | Youatt et al. ........... 380/210 |
| 2004/0239679 | A1* | 12/2004 | Ito et al. ................ 345/555 |
| 2005/0081161 | A1 | 4/2005 | MacInnes et al. |
| 2005/0088447 | A1 | 4/2005 | Hanggie et al. |
| 2005/0125747 | A1 | 6/2005 | Nelson et al. |
| 2005/0237335 | A1* | 10/2005 | Koguchi et al. ......... 345/582 |
| 2005/0267721 | A1 | 12/2005 | Thalhammer-Reyero |
| 2006/0039674 | A1 | 2/2006 | Sonoda et al. |
| 2006/0072164 | A1* | 4/2006 | Kato et al. ............ 358/426.07 |
| 2006/0098023 | A1 | 5/2006 | Courthard |
| 2006/0101431 | A1 | 5/2006 | Pepin et al. |
| 2006/0164414 | A1 | 7/2006 | Farinelli |
| 2006/0176316 | A1* | 8/2006 | Nagasaki et al. ........ 345/621 |
| 2006/0232583 | A1 | 10/2006 | Petrov et al. |
| 2006/0242164 | A1 | 10/2006 | Evans et al. |
| 2006/0253214 | A1 | 11/2006 | Gross |
| 2006/0294125 | A1* | 12/2006 | Deaven ................. 707/101 |
| 2007/0018990 | A1 | 1/2007 | Shreiner |
| 2007/0018996 | A1* | 1/2007 | Wang et al. ............ 345/592 |
| 2007/0083805 | A1 | 4/2007 | Randazzo et al. |
| 2007/0165035 | A1 | 7/2007 | Duluk, Jr. et al. |
| 2007/0195085 | A1 | 8/2007 | Farinelli |
| 2007/0233678 | A1 | 10/2007 | Bigelow |
| 2007/0268297 | A1* | 11/2007 | Novosad ................ 345/501 |
| 2008/0088630 | A1 | 4/2008 | Bakalash et al. |
| 2008/0091491 | A1 | 4/2008 | Thorpe et al. |
| 2008/0266296 | A1* | 10/2008 | Ramey et al. ........... 345/440 |
| 2009/0073187 | A1* | 3/2009 | Rampson et al. ........ 345/619 |
| 2009/0138113 | A1 | 5/2009 | Hoguet |
| 2009/0160856 | A1 | 6/2009 | Hoguet |
| 2009/0222469 | A1 | 9/2009 | Maillot et al. |
| 2009/0251478 | A1 | 10/2009 | Maillot et al. |
| 2009/0254611 | A1 | 10/2009 | Pena et al. |
| 2009/0265301 | A1 | 10/2009 | Chen et al. |
| 2010/0046846 | A1* | 2/2010 | Brown .................. 382/233 |

OTHER PUBLICATIONS

Office Action dated Aug. 6, 2009 for German Pat. App. No. 102009007334.5.

English Translation of Office Action dated Aug. 6, 2009 for German Pat. App. No. 102009007334.5.

"Bildsynthese" (German), Wikipedia, available at http://de.wikipedia.org/wiki/Bildsynthese, Aug. 2009.

"Grafikpipeline" (German), Wikipedia, available at http://de.wikipedia.org/wiki/Grafikpipeline, Aug. 2009.

"Textur (Computergrafik)" (German), Wikipedia, available at http://de.wikipedia.org/wiki/Textur_(Computergrafik)., Aug. 2009.

"Texture Mapping" (German), Wikipedia, available at http://de.wikipedia.org/wiki/Texture_Mapping, Aug. 2009.

"Image Synthesis," English Translation of "Bildsynthese" (German), Aug. 2009.

"Graphics Pipeline," English Translation of "Grafikpipeline" (German), Aug. 2009.

"Texture (Computer Graphics)," English Translation of "Textur (Computergrafik)" (German), Aug. 2009.

"Texture Mapping," English Translation of "Texture Mapping" (German), Aug. 2009.

"Mental Mill Functional Overview," Mental Images GmbH, White Paper, Feb. 11, 2007. (15 pages).

Office Action in U.S. Appl. No. 12/250,458 mailed Feb. 3, 2012.

* cited by examiner

MATERIAL DATA PROCESSING PIPELINE

BACKGROUND OF THE INVENTION

1. Field of the Invention

The present invention generally relates to the field of computer graphics. More specifically, the invention relates to a material authoring pipeline.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable two-dimensional (2D) or three-dimensional (3D) construct. Initially, such a construct is defined in part by the regions making up the surface of that construct. A rendering application may be used to add detail to the construct by applying materials to various regions of the construct. Additionally, computer models can be static or animated, where time is a fourth dimension. For example, rendering a motion-blurred object is a four-dimensional (4D) rendering process.

The perceived realism of a rendered scene depends in part on the quality of the materials applied to constructs within the scene. Materials are typically generated using a program known in the art as a "shader" that transforms raw data into a computer representation. The raw data associated with materials is often generated by scanning surfaces using a material scanner. For example, a sample of sandpaper may be scanned to gather raw data that could be used to generate a material resembling the actual texture of the sandpaper. Material scanners are often configured with a number of mobile light sources of variable intensity that illuminate the surface from many different angles and with a range of intensity. A number of mobile digital cameras may then record the response of the surface to the different configurations of lighting and intensity. The data output by a material scanner describes the response of the scanned surface to the variety of lighting conditions.

FIG. 1 illustrates the response of a surface 102 to an incident light beam 104, according to prior art. Depending on the physical properties of surface 102, light beam 104 may be reflected away from surface 102, scattered by surface 102, transmitted through surface 102, scattered upon transmission through surface 102, and may undergo subsurface scattering caused by surface 102, among others. Each of these effects may be measured by cameras surrounding material 102. The captured data, referred to as "BxDF data," may be digitally recorded on a computer memory. A material that represents the surface may then be manually programmed by a computer programmer for use when rendering using a particular rendering engine. The material may be programmed to compress the captured data using a BxDF compression algorithm.

One drawback of this conventional approach is that materials based on the captured data are usually generated for use with only one rendering engine, due to the complex programming involved. Additionally, if a material is created that implements a first BxDF compression algorithm, then there is no way to determine how the quality of the resultant material compares to a material that implements a second BxDF compression algorithm, without explicitly programming both materials. These inherent limitations cause programming of materials using conventional techniques to be an inefficient and cumbersome endeavor.

Accordingly, there remains a need in the art for an efficient way to generate shaders from scanner data.

SUMMARY OF THE INVENTION

Embodiments of the invention provide a method for generating a shader that is used by a rendering engine to render a visual representation of a computer model. A shader generation engine (SGE) receives a set of surface data that describes a surface in view of various lighting conditions. The shader generation engine compresses the set of surface data to generate a compressed representation of the set of surface data based on a selected compression algorithm. The shader generation engine generates a shader based on the compressed representation that is configured to be implemented with a rendering engine, and generates a set of shader data based on the compressed representation that includes a set of material characteristics for coloring pixels of the visual representation.

Advantageously, the shader generation process is simplified compared to prior art techniques. A shader generation engine is capable of generating different shaders for a particular surface according to a user selection of a compression algorithm and a user selection of a rendering engine, allowing the user to compare the performance quality of shaders associated with different compression algorithm-rendering engine combinations without manually programming the shaders.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
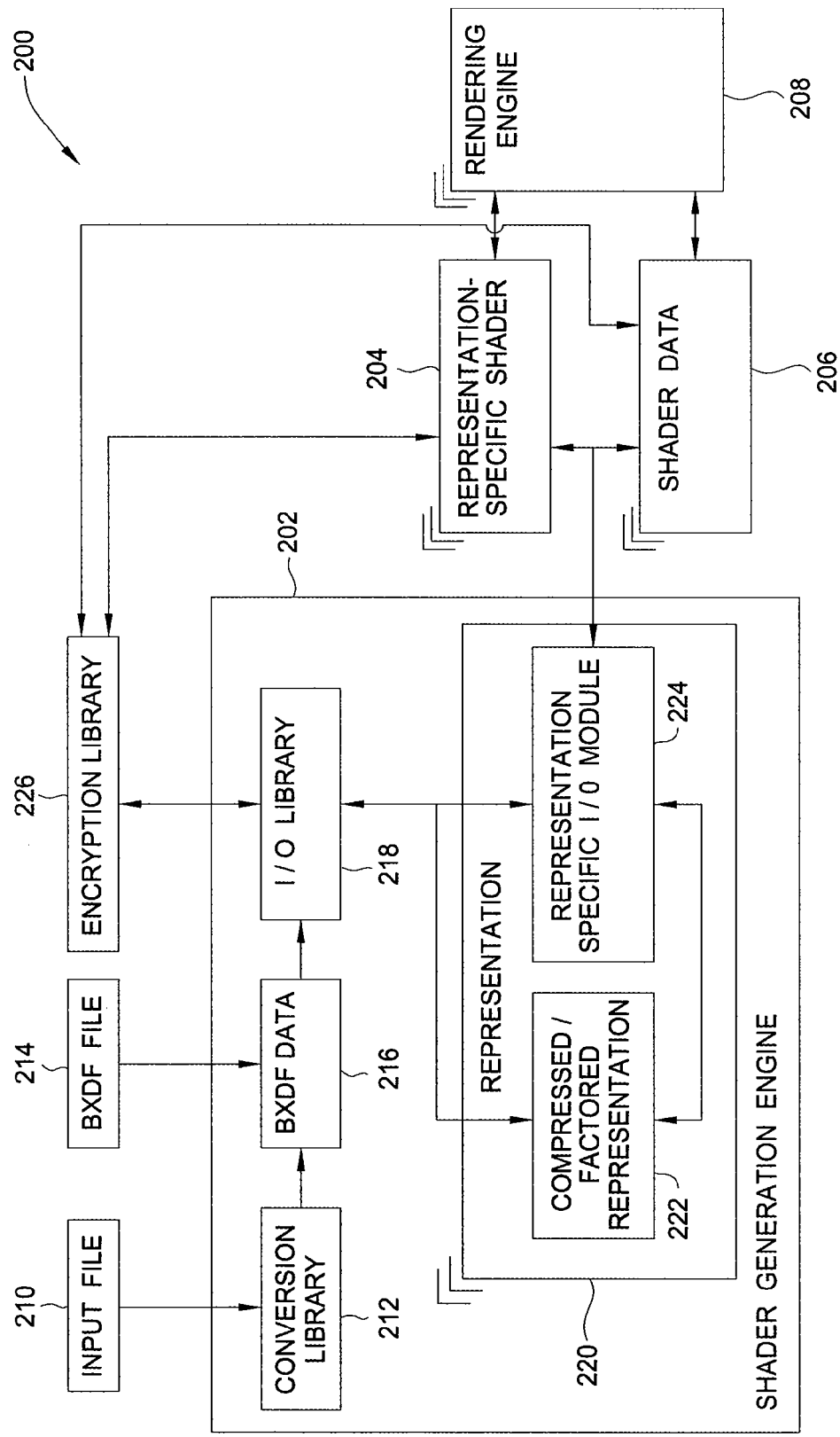
FIG. 2 is a block diagram of a material authoring pipeline, according to one embodiment of the invention.

FIG. 2 is a block diagram of a material authoring pipeline 200, according to one embodiment of the invention. The components illustrated in FIG. 2 may include computer software applications executing on existing computer systems, e.g., desktop computers, server computers, laptop computers, tablet computers, video game consoles, mobile devices, and the like. The software applications described herein, however, are not limited to any particular computer system and may be adapted to take advantage of new computer systems as they become available.

Additionally, the components illustrated in FIG. 2 may be implemented as software applications that execute on a single computer system or on distributed systems communicating over computer networks such as local area networks or large, wide area networks, such as the Internet. For example, a shader generation engine (SGE) 202 may include a software program executing on a client computer system at one physical location communicating with a rendering engine 208 at another physical location. Also, in one embodiment, the rendering application 208 and the SGE 202 may be provided as application program (or programs) stored on computer readable storage media such as a CD-ROM, DVD-ROM, flash memory module, or other tangible storage media.

Figure 1:
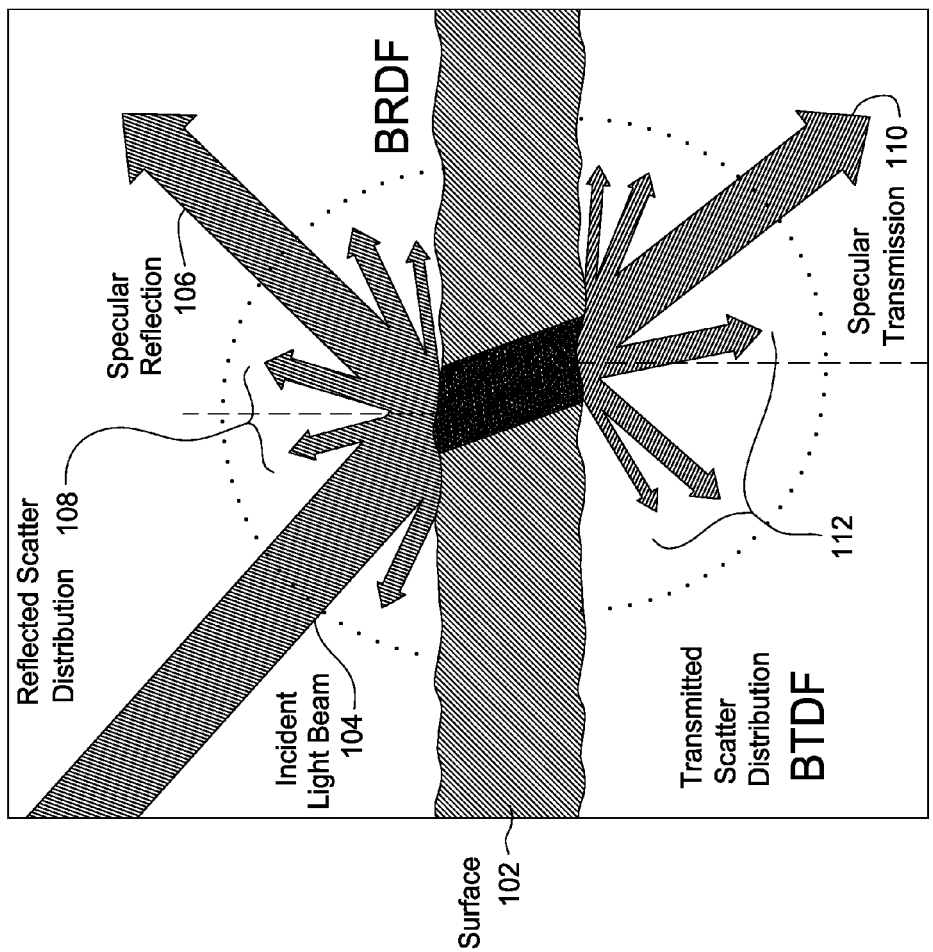
FIG. 1 is a prior art diagram that illustrates the response of a surface to an incident light beam.

As shown, material authoring pipeline 200 includes, without limitation, SGE 202, one or more representation-specific shaders 204, shader data 206 associated with each representation-specific shader 204, one or more rendering engines 208, and input file 210. Material authoring pipeline 200 optionally includes a BxDF file 214 and an encryption library 226. Input file 210 is provided by a user and includes data that describes the response of a surface to a variety of lighting conditions, referred to herein as "surface data." The surface data stored within input file 210 is gathered by scanning the surface with a material scanner, as previously described in FIG. 1. Numerous material scanners are commercially available, and each may generate surface data in a different format. In one embodiment, the surface data may be converted by the user into a vendor-specified format. The user may, for example, program a routine to convert the surface data into the vendor-specified format, or the user may configure the material scanner to output surface data directly to the vendor-specified format. In one embodiment, input file 210 is an Extensible Markup Language (XML) file.

Input file 210 is received by SGE 202 and processed by a conversion library 212. Conversion library 212 is configured to convert the surface data stored within input file 210 to a material scanner-neutral format for further processing. This format approximates the response of the surface as a bidirectional reflectance distribution function (BRDF) and a bidirectional transmittance distribution function (BTDF). Referring back to FIG. 1, the BRDF is shown to correspond to specular reflection 106 and reflected scatter distribution 108; whereas, the BTDF is shown to correspond to specular transmission 110 and transmitted scatter distribution 112. These distributions are collectively known as the "BxDF." Referring again to FIG. 2, input file 210 is converted into BxDF data 216 by conversion library 212.

In one embodiment, BxDF file 214 that includes BxDF data 216 is directly provided by a user to SGE 202. A user may, for example, wish to hide proprietary surface data output by a material scanner. For example, a user may create a computer program to convert the proprietary surface data into BxDF file 214. In such an embodiment, input file 210 is not input by the user, and conversion library 212 is bypassed altogether.

An I/O library 218 within SGE 202 includes subroutines corresponding to a variety of compression algorithms that may be used to compress BxDF data 216. The compression algorithms implement different "models," and are provided as subroutines within the I/O library 218. These models may include the Phong model, the Blinn-Phong model, the Ward model, the Cook-Torrence Model, the Ashikmin Model, the Lafortune model, the He model, the Splines model, the spherical harmonic model, the spherical wavelets model, the singular values decomposition model, the normalized decomposition model, the non-negative matrix factorization model, the harmonic factorization model, and the importance sampling oriented factorization model, among others. I/O library 218 receives a user selection of a compression algorithm and generates a compressed/factored representation 222 of BxDF data 216. In one embodiment, the precision of the selected compression algorithm may also be specified by the user.

Compressed/factored representation 222 is stored within a representation 220 that also includes a representation-specific I/O module 224. Representation-specific I/O module 224 receives user input specifying a particular rendering engine 208 and is configured to generate representation-specific shader 204 and associated shader data 206 based on this selection. Representation-specific shader 204 is a software program that is executed by the selected rendering engine 208 to generate a visual representation of the surface associated with the compressed/factored representation 222. This visual representation may be output to a computer display.

Shader data 206 is associated with representation-specific shader 204 and provides data used by representation-specific shader 204 and rendering engine 208 to generate the pixels comprising the visual representation of the surface. In one embodiment, shader data 206 may be encrypted. Encryption library 226 provides encryption information that may be used by the representation specific I/O module 224 and the I/O library 218 to encrypt the shader data 206.

Rendering engines 208 may include software rendering engines, such as Mental Ray or RenderMan, hardware rendering engines that use OpenGL or DirectX application programming interfaces (APIs), or third-party rendering engines such as Gelato. Rendering engines 208 may be provided separately from SGE 202, or vendor-provided rendering engines may be provided with SGE 202. In one embodiment, representation-specific I/O module 224 may perform an optimization on compressed/factored representation 222 based on a user selection of rendering engine 208 prior to generating representation-specific shader 204 and shader data 206.

Once representation-specific shader 204 and shader data 206 are generated, rendering engine 208 may render a visual representation of the surface on a computer display. A user may then visually inspect the results. The user may also select a different compression algorithm or a different rendering engine 208 with which another representation-specific shader 204 may be generated using SGE 202. The first representation-specific shader 204 and associated shader data 206 may be saved, and a second representation-specific shader 204 and associated shader data 206 may then be generated based on a user selection of a second compression algorithm and/or second rendering engine 208. The user may generate any number of representation-specific shaders 204 and associated shader data 206 based on the BxDF data 216, where the number may be equal to the number of compression algorithm subroutines in the I/O library 218 multiplied by the number of available rendering engines 208. Each combination may be used to render a different visual representation of the material described by BxDF data 216. The user may compare the results of rendering using one representation-specific shader with the results of rendering using a different representation-specific shader to determine which representation-specific shader provides the better result, without explicitly programming each representation-specific shader from scratch.

In alternative embodiments, a third-party may generate the representation-specific shader 204 and the associated shader data 206 based on a selection of a compression algorithm and a rendering engine 208. The representation-specific shader 204 and the associated shader data 206 may then be shipped to a user and used to render a visual representation of the surface with the third-party selected rendering engine 208. In still further embodiments, multiple rendering engines may use the same shader data 206 when rendering a scene. Software rendering engines may be configured to share the shader data 206, and only implement the shaders using a specific renderer API.

Figure 3:
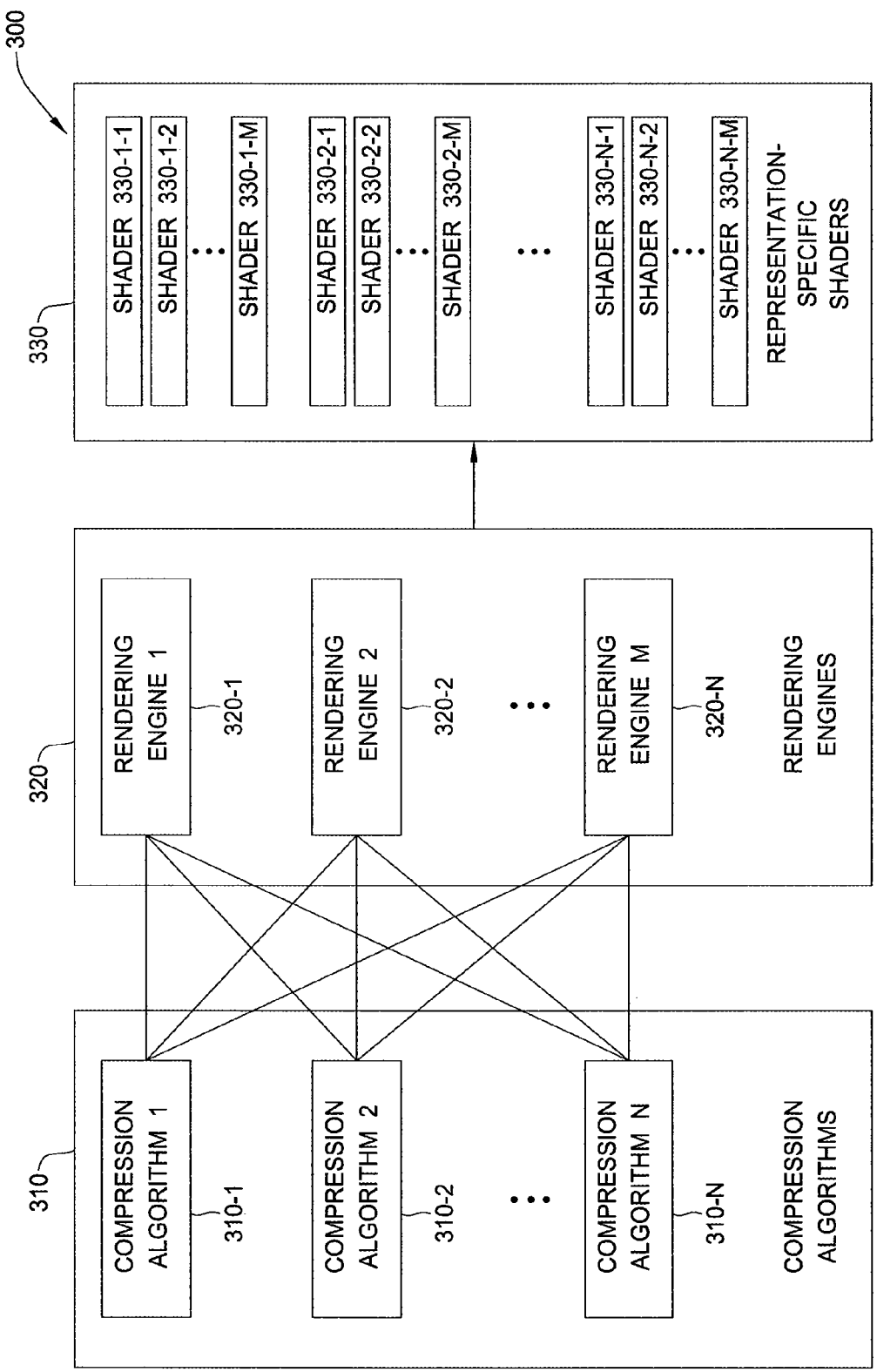
FIG. 3 is a conceptual diagram illustrating different combinations of compression algorithms and rendering engines that may be used to generate a representation-specific shader, according to one embodiment of the invention.

FIG. 3 is a conceptual diagram illustrating different combinations of compression algorithms 310 and rendering engines 320 that may be used to generate a representation-specific shader 330 for a particular set of BxDF data 216, according to one embodiment of the invention. Compression algorithms 310-1 through 310-N may be subroutines executed by I/O library 218 to implement a model that approximates the BxDF data 216. Each model may be classified as an analytical model or a numerical model. An analytical model represents BxDF data 216 by generating a function or functions that output an approximation of the original BxDF data 216 when those functions are evaluated with certain input data. In one embodiment, the function(s) and the associated input data occupy a smaller memory footprint than the original BxDF data 216. A numerical model represents BxDF data 216 by performing a reversible mathematical transformation on the BxDF data 216 that results in a reduced-size representation of the BxDF data 216. For example, if the BxDF data 216 is a matrix of numbers, then that matrix may be transformed into several smaller matrices that would, as a whole, occupy a smaller memory footprint than the BxDF data 216. To recreate the BxDF data 216, these smaller matrices could be multiplied together in a particular sequence. Both the analytical models and the numerical models may be implemented with varying degrees of accuracy, and may be used to generate approximations that may be visually indistinguishable from the original BxDF data 216.

A user may select any of the provided compression algorithms 310-1 through 310-N to compress the BxDF data 216 and may select one of the rendering engines 320-1 through 320-M. Rendering engines 320-1 through 320-M may include Mental Ray, RenderMan, Maya, or other rendering engines. Rendering engines 320-1 through 320-M may implement different rendering techniques, such as ray tracing, rasterization, radiosity, or ray casting, and may be specifically designed to handle 2D images, 3D images, 3D animation, and/or 4D images such as motion-blurred images, among others.

Based on a user selection of one of the compression algorithms 310-1 through 310-N and one of the rendering engines 320-1 through 320-M, SGE 202 generates a representation-specific shader 330-1.1 through 330-N.M. In practice, SGE 202 also generates shader data 206 (not shown in FIG. 3) associated with each representation-specific shader 330-1.1 through 330-N.M. Depending on the particular combination of compression algorithm 310 and rendering engine 208 selected by the user, SGE 202 generates a different representation-specific shader 204 for a particular set of BxDF data 216. As shown, for N total compression algorithms 310 and M total rendering engines 208, N*M different representation-specific shaders 204 are possible for a particular set of BxDF data 216. In one embodiment, a representation-specific shader 204 generated for a particular rendering engine 208 may be used by other rendering engines 208 to produce a visual representation of a surface.

As one having ordinary skill in the art should understand, a shader is a program associated with a rendering engine used by that rendering engine to colorize pixels to produce a desired appearance. For example, a shader could be programmed for a rendering engine to colorize pixels associated with a concrete material surface, while another shader could be programmed for that rendering engine to colorize pixels associated with a liquid material surface.

A user may generate some or all of the possible representation-specific shaders 330-1 through 330-N.M corresponding to the different combinations of compression algorithms 310-1 through 310-N and rendering engines 320-1 through 320-M, and may compare the effectiveness of each representation-specific shader 330-1 through 330-N.M for rendering a given set of BxDF data 216 with a particular rendering engine 208. For example, some representation-specific shaders 330-1 through 330-N.M may be better suited for 3D animation rendering, while others may be better suited for static image rendering.

In one embodiment, SGE 202 may generate representation-specific shader 330 automatically in response to a user selection of one of the compression algorithms 310 and one of the rendering engines 320. Importantly, the user is not required to manually program the representation-specific shader in a programming language, such as C++, to observe the performance of a particular combination of compression algorithm 310 and rendering engine 320. SGE 202 allows a user to visually inspect the result of rendering using each representation-specific shader 330 generated for each combination of compression algorithm 310 and rendering engine 320.

Figure 4:
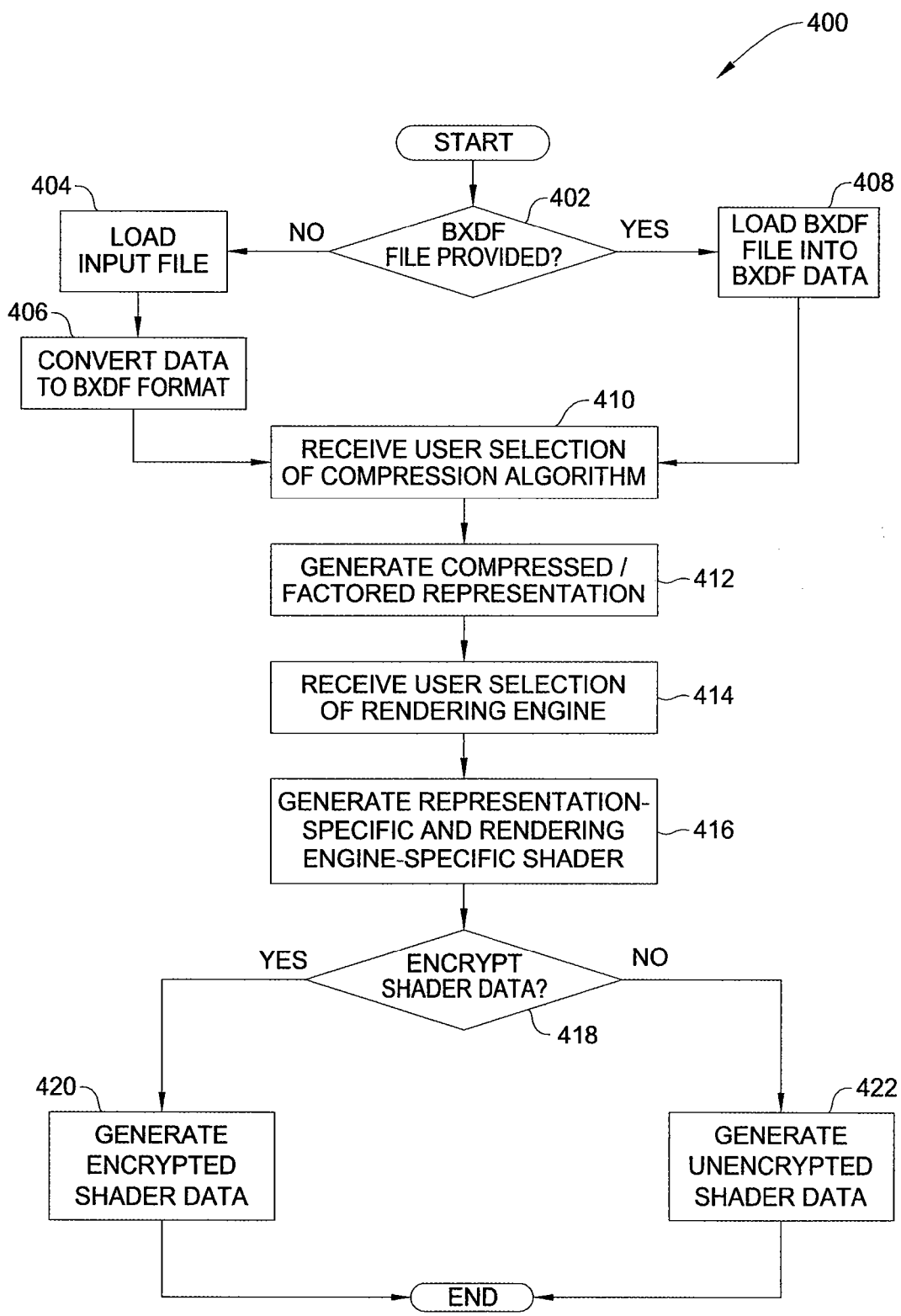
FIG. 4 is a flowchart of method steps for generating a representation-specific shader and associated shader data, according to one embodiment of the invention.

FIG. 4 is a flowchart of method steps for generating a representation-specific shader and associated shader data, according to one embodiment of the invention. Persons skilled in the art will understand that, even though the method 400 is described in conjunction with the systems of FIGS. 2 and 3, any system configured to perform the method steps, in any order, is within the scope of the present invention.

As shown, the method 400 begins at step 402, where either a BxDF file 214 or an input file 210 is received by SGE 202. If a BxDF file 214 is received, then at step 408 SGE 202 loads the BxDF file 214 into BxDF data 216, and the method 400 advances to step 410.

If the BxDF file 214 is not received at step 402, then at step 404 SGE 202 receives input file 210. At step 406, conversion library 212 converts the input file 210 into BxDF format and stores the converted data in BxDF data 216. The method 400 then advances to step 410. In one embodiment, input file 210 is an XML file, and conversion library 212 is an XML conversion library.

At step 410, SGE 202 receives a user selection of one of the compression algorithms 310-1 through 310-N. As previously described in FIGS. 2 and 3, compression algorithms 310-1 through 310-N are subroutines stored by I/O library 218 that implement different models that may be used to compress the BxDF data 216. In one embodiment, a user may specify the accuracy of the selected compression algorithm 310. At step 412, I/O library 218 executes the selected compression algorithm 310 and generates the compressed/factored representation 222. Compressed/factored representation 222 may occupy a smaller memory footprint than BxDF data 216, and may approximate BxDF data 216.

At step 414, SGE 202 receives a user selection of one of the available rendering engines 320-1 through 320-M. A user may select the rendering engine 320 based on, for example, the surface data represented by BxDF data 216, or the type of rendering desired, which may include 2D drawings, 3D animations, or computer simulations. At step 416, representation-specific I/O module 224 generates one of the representation-specific shaders 330-1 through 330-N.M based on the data stored in compressed/factored representation 222, the compression algorithm 310 used to generate compressed/factored representation 222, and the selected rendering engine 320.

At step 418, representation-specific I/O module 224 may generate encrypted shader data 206 according to user specification. If the user wishes to encrypt shader data 206, then at step 420 representation-specific I/O module 224 accesses encryption library 226 via I/O library 218 and generates encrypted shader data 206 based on the data stored in compressed/factored representation 222, the compression algorithm 310 used to generate compressed/factored representation 222, and the selected rendering engine 220. A user may opt to encrypt shader data 206 when, for example, input file 210 or BxDF file 214 includes proprietary data or proprietary data formats. In alternative embodiments, the representation-specific shader 204 may also be encrypted using the encryption library 226.

If the user does not wish to encrypt shader data 206, then at step 422, representation-specific I/O module 224 generates shader data 206 based on the data stored in compressed/factored representation 222, the compression algorithm 310 used to generate compressed/factored representation 222, and the selected rendering engine 320.

Once a representation-specific shader 330 and associated shader data 206 have been generated via the method 400, a visual representation of the surface described by either input file 210 or BxDF file 214 may be rendered using the selected rendering engine 320, the representation-specific shader 330, and the associated shader data 206. The visual representation may then be output to a visual display.

Figure 5:
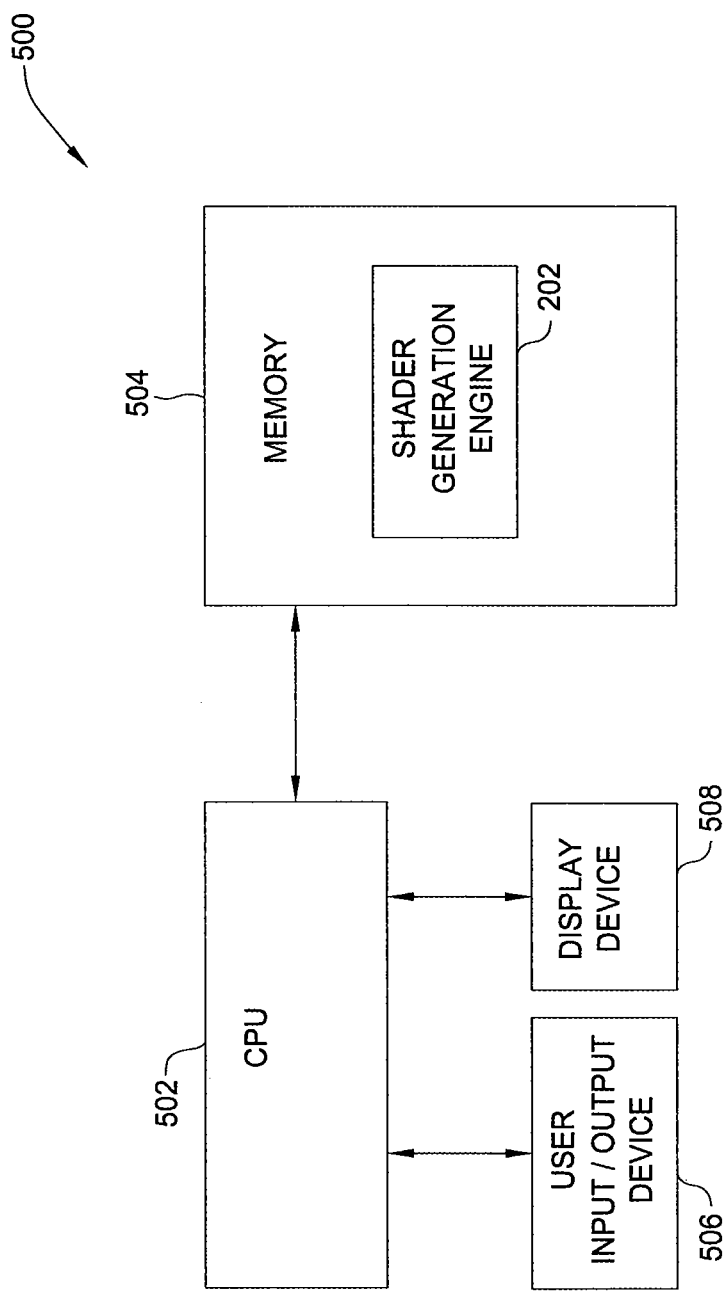
FIG. 5 is a block diagram of a computer system configured to implement one or more aspects of the present invention.

FIG. 5 is a block diagram of a computer system 500 configured to implement one or more aspects of the present invention. As shown, the computer system 500 includes a processor element 502 (e.g., a CPU), a memory 504, e.g., random access memory (RAM) and/or read only memory (ROM), an SGE 202, as described herein, stored within memory 504, various input/output devices 506, which may include user input devices such as a keyboard, a keypad, a mouse, and the like, and storage devices, including but not limited to, a tape drive, a floppy drive, a hard disk drive or a compact disk drive, and a receiver, and various display devices 508, which may include a cathode-ray tube (CRT) monitor or an liquid-crystal display (LCD) monitor.

In sum, a shader generation engine (SGE) receives surface data that may be captured with a material scanner and converts the surface data into BxDF data. An I/O library within the SGE converts the BxDF data into a compressed representation based on a user selection of a compression algorithm. A representation-specific I/O module receives the compressed representation and generates a shader and associated shader data based on a user selection of a rendering engine.

Advantageously, the shader generation process is simplified compared to prior art techniques. The SGE is capable of generating different shaders for a particular set of surface data according to a user selection of a compression algorithm and a user selection of a rendering engine, allowing the user to compare the performance quality of shaders associated with different compression algorithm-rendering engine combinations without manually programming the shaders. Additionally, the SGE may generate shaders and shader data based on artificially-generated surface data. For example, a user may provide surface data generated from a computer model of a material, or may provide surface data produced by blending several sets of surface data together and modulating the combined surface data with texture data.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed:

1. A method for generating a shader that is used by a rendering engine to render a visual representation of a computer model, the method comprising:
receiving a set of surface data that describes a surface in view of various lighting conditions;
compressing the set of surface data to generate a compressed representation of the set of surface data based on a selected compression algorithm;
selecting a rendering engine;
generating a shader based on the rendering engine, the selected compression algorithm, and the compressed representation of the set of surface data; and
generating a set of shader data, via the shader, based on the compressed representation, wherein the shader data includes a set of material characteristics for coloring pixels of the visual representation.

2. The method of claim 1, wherein the set of surface data is derived at least in part from a bidirectional reflectance function and a bidirectional transmittance function.

3. The method of claim 2, wherein the set of surface data is included in an Extensible Markup Language (XML) file.

4. The method of claim 2, further comprising the step of converting the set of surface data to bidirectional reflectance function data and bidirectional transmittance function data.

5. The method of claim 1, further comprising the step of encrypting the shader data to generate encrypted shader data.

6. The method of claim 5, wherein the set of surface data comprises proprietary surface data, and the encrypted shader data prohibits access to the proprietary surface data.

7. The method of claim 1, wherein the compression algorithm implements a Phong model, a Blinn-Phong model, a Ward model, a Cook-Torrence Model, a Ashikmin model, a Lafortune model, a He model, a Splines model, a spherical harmonic model, a spherical wavelets model, a singular values decomposition model, a normalized decomposition model, a non-negative matrix factorization model, a harmonic factorization model, or an importance sampling oriented factorization model.

8. The method of claim 7, wherein the step of compressing the set of surface data is based on an accuracy value for the compression algorithm.

9. The method of claim 1, wherein the rendering engine comprises either a software rendering engine or a hardware rendering engine configured to implement ray tracing, rasterization, radiosity, or ray casting operations.

10. The method of claim 1, further comprising:
compressing the set of surface data to generate a second compressed representation of the set of surface data based on a second selected compression algorithm;
selecting a second rendering engine;
generating a second shader based on the second rendering engine, the second selected compression algorithm, and the second compressed representation of the set of surface data; and
generating a second set of shader data, via the second shader, based on the second compressed representation, wherein the second set of shader data includes a second set of material characteristics for coloring pixels of the visual representation.

11. The method of claim 1, further comprising providing the shader data to the shader.

12. The method of claim 1, wherein the compression algorithm is selected by a user from a library of compression algorithms, and wherein the rendering engine is selected by the user from amongst a plurality of rendering engines.

13. A non-transitory computer-readable medium that, when executed by a processor, cause a shader generation engine to generate a shader used by a rendering engine to render a visual representation of a computer model, the method comprising:
receiving a set of surface data that describes a surface in view of various lighting conditions;
compressing the set of surface data to generate a compressed representation of the set of surface data based on a selected compression algorithm;
selecting a rendering engine;
generating a shader based on the rendering engine, the selected compression algorithm, and the compressed representation of the set of surface data; and
generating a set of shader data, via the shader, based on the compressed representation, wherein the shader data includes a set of material characteristics for coloring pixels of the visual representation.

14. The non-transitory computer-readable medium of claim 13, wherein the set of surface data is derived at least in part from a bidirectional reflectance function and a bidirectional transmittance function.

15. The non-transitory computer-readable medium of claim 14, wherein the set of surface data is included in an Extensible Markup Language (XML) file.

16. The non-transitory computer-readable medium of claim 14, further comprising the step of converting the set of surface data to bidirectional reflectance function data and bidirectional transmittance function data.

17. The non-transitory computer-readable medium of claim 13, further comprising the step of encrypting the shader data to generate encrypted shader data.

18. The non-transitory computer-readable medium of claim 17, wherein the set of surface data comprises proprietary surface data, and the encrypted shader data prohibits access to the proprietary surface data.

19. The non-transitory computer-readable medium of claim 13, wherein the compression algorithm implements a Phong model, a Blinn-Phong model, a Ward model, a Cook-Torrence Model, a Ashikmin model, a Lafortune model, a He model, a Splines model, a spherical harmonic model, a spherical wavelets model, a singular values decomposition model, a normalized decomposition model, a non-negative matrix factorization model, a harmonic factorization model, or an importance sampling oriented factorization model.

20. The non-transitory computer-readable medium of claim 19, wherein the step of compressing the set of surface data is based on an accuracy value for the compression algorithm.

21. The non-transitory computer-readable medium of claim 13, wherein the rendering engine comprises either a software rendering engine or a hardware rendering engine configured to implement ray tracing, rasterization, radiosity, or ray casting operations.

22. The non-transitory computer-readable medium of claim 13, further comprising:
compressing the set of surface data to generate a second compressed representation of the set of surface data based on a second selected compression algorithm;
selecting a second rendering engine;
generating a second shader based on the second rendering engine, the second selected compression algorithm, and the second compressed representation of the set of surface data; and
generating a second set of shader data, via the second shader, based on the second compressed representation, wherein the second set of shader data includes a second set of material characteristics for coloring pixels of the visual representation.

23. The non-transitory computer-readable medium of claim 13, wherein the shader data is provided to the shader.

24. The non-transitory computer-readable medium of claim 13, wherein the compression algorithm is selected by a user from a library of compression algorithms, and wherein the rendering engine is selected by the user from amongst a plurality of rendering engines.

25. A system for generating a shader that is used by a rendering engine to generate a visual representation of a computer model, the system comprising:
a processor; and
one or more memories that store instructions configured to:
receive a set of surface data that describes a surface in view of various lighting conditions;
compress the set of surface data to generate a compressed representation of the set of surface data based on a selected compression algorithm;
select a rendering engine;
generate a shader based on the rendering engine, the selected compression algorithm, and the compressed representation of the set of surface data; and
generate a set of shader data, via the shader, based on the compressed representation, wherein the shader data includes a set of material characteristics for coloring pixels of the visual representation.

26. The system of claim 25, wherein the one or more memories include a conversion library configured to implement the step of receiving the set of surface data.

27. The system of claim 25, wherein the one or more memories include an input/output library configured to implement the step of compressing the set of surface data.

28. The system of claim 25, wherein the one or more memories include a representation-specific input/output module configured to implement the steps of generating the shader and generating the set of shader data.

29. The system of claim 25, wherein the one or more memories are further configured to provide the shader data to the shader.

30. The system of claim 25, wherein the compression algorithm is selected by a user from a library of compression algorithms, and wherein the rendering engine is selected by the user from amongst a plurality of rendering engines.

* * * * *